(No Model.)

F. H. LITTLEJOHN.
LAP ROBE HOLDER FOR VEHICLES.

No. 347,944. Patented Aug. 24, 1886.

WITNESSES:
Chas. Nida
C. Sedgwick

INVENTOR:
F. H. Littlejohn
BY Munn & Co.
ATTORNEYS.

UNITED STATES PATENT OFFICE.

FITZ HUGH LITTLEJOHN, OF BROADALBIN, NEW YORK.

LAP-ROBE HOLDER FOR VEHICLES.

SPECIFICATION forming part of Letters Patent No. 347,944, dated August 24, 1886.

Application filed November 19, 1885. Serial No. 183,315. (No model.)

*To all whom it may concern:*

Be it known that I, FITZ HUGH LITTLEJOHN, of Broadalbin, in the county of Fulton and State of New York, have invented a new and useful Improvement in Lap-Robe Holders for Vehicles, of which the following is a full, clear, and exact description.

Reference is to be had to the accompanying drawings, forming a part of this specification, in which similar letters of reference indicate corresponding parts in both figures.

Figure 1:
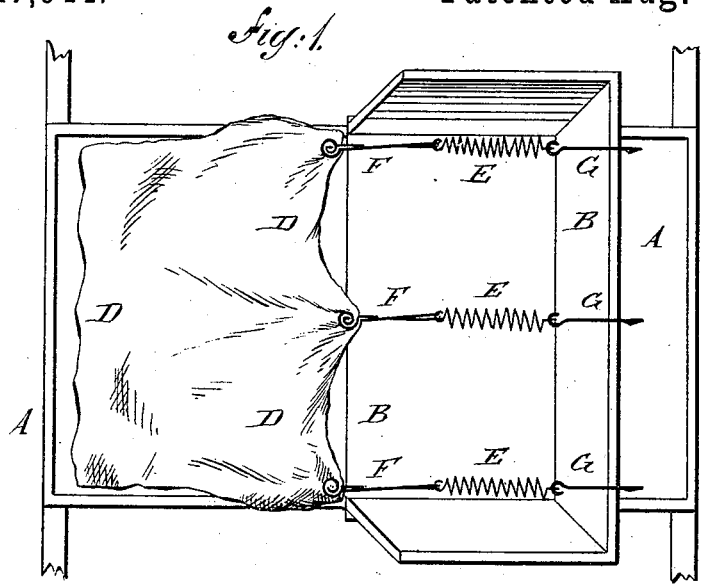
Figure 2:
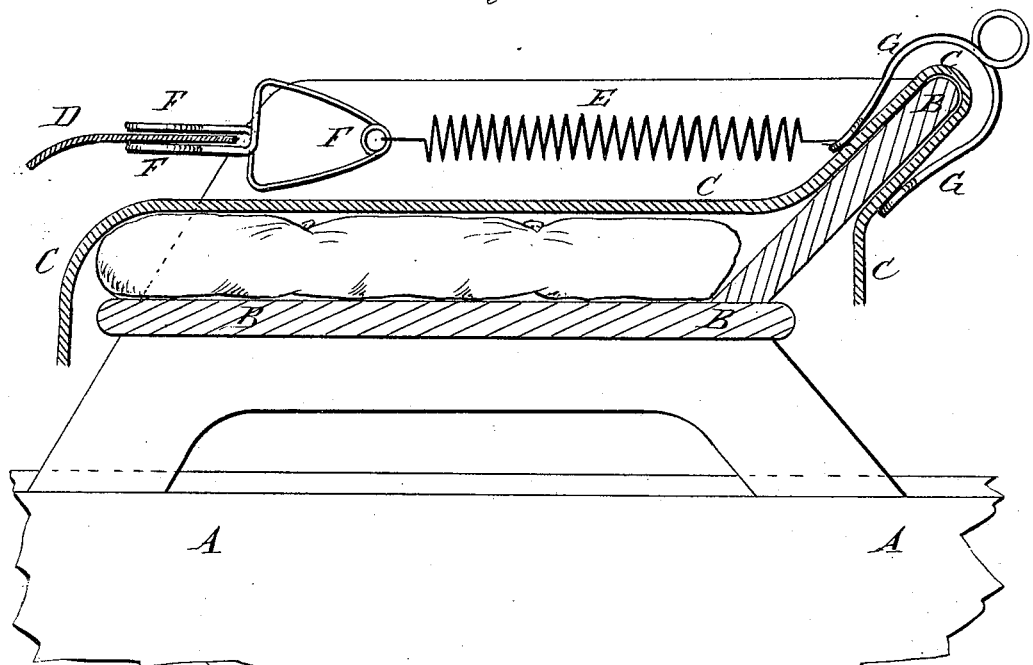

Figure 1 is a plan view of three of my improved holders, shown as applied to a lap-robe and a vehicle-seat. Fig. 2 is a side elevation of the same, the seat and a part of the lap-robe being shown in section, and showing a section of a seat-robe in place.

The object of this invention is to provide simple, convenient, and effective means for holding lap-robes in place in vehicles.

The invention consists of a spring-hook, a spring-clamp, and a flexible connection between said hook and clamp, as hereinafter fully described.

A represents the body, and B the seat, of an ordinary vehicle.

C represents the robe usually spread over the seat of a vehicle in cold weather, and D is the lap-robe.

E are springs, made of spirally-coiled elastic wire or other suitable material. To the forward ends of the springs E are hinged ordinary spring-clamps, F, to clasp and hold the lap-robe D. To the rear ends of the springs E are attached spring-hooks G, of sufficient elasticity to allow them to be sprung over the edge of the seat-back and over the seat-robe C when used, and of sufficient strength to keep them securely in place upon the said seat-back.

The holders should be made of such a length as to hold the lap-robe with the necessary closeness to the body of the rider.

When a single person is riding in the vehicle, two holders should be used, one upon each side of the rider's body.

When two persons are riding in the same seat, three holders may be used, one between the persons and the others at the outer sides of the said persons, the relative positions of the three holders being illustrated in Fig. 1.

Having thus fully described my invention, I claim as new and desire to secure by Letters Patent—

1. As an improved article of manufacture, a lap-robe holder consisting of spring-hook, spring-clamp, and a flexible connection between the said hook and clamp, as set forth.

2. The herein-described lap-robe holder, consisting of the spring E, the spring-clamp F at one end of the spring, and the spring-hook G at the other end of the said spring, as specified.

FITZ HUGH LITTLEJOHN.

Witnesses:
    JAMES T. GRAHAM,
    C. SEDGWICK.